(12) United States Patent
Sauder et al.

(10) Patent No.: US 10,817,812 B2
(45) Date of Patent: Oct. 27, 2020

(54) SYSTEM AND METHODS FOR IDENTIFYING FIELDS AND TASKS

(71) Applicant: The Climate Corporation, San Francisco, CA (US)

(72) Inventors: Doug Sauder, Livermore, CA (US); Ryan Allgaier, East Peoria, IL (US)

(73) Assignee: THE CLIMATE CORPORATION, San Francisco, CA (US)

( * ) Notice: Subject to any disclaimer, the term of this patent is extended or adjusted under 35 U.S.C. 154(b) by 772 days.

(21) Appl. No.: 15/532,940

(22) PCT Filed: Nov. 24, 2015

(86) PCT No.: PCT/US2015/062501
§ 371 (c)(1),
(2) Date: Jun. 2, 2017

(87) PCT Pub. No.: WO2016/086035
PCT Pub. Date: Jun. 2, 2016

(65) Prior Publication Data
US 2017/0344922 A1 Nov. 30, 2017

Related U.S. Application Data

(60) Provisional application No. 62/083,640, filed on Nov. 24, 2014.

(51) Int. Cl.
*G06Q 10/06* (2012.01)
*G06F 9/30* (2018.01)
(Continued)

(52) U.S. Cl.
CPC ..... *G06Q 10/06311* (2013.01); *G06F 3/0488* (2013.01); *G06F 9/30181* (2013.01); *G06Q 50/02* (2013.01); *G06Q 10/10* (2013.01)

(58) Field of Classification Search
CPC ......... G06Q 30/00; G06Q 00/00–99/00; G06F 19/00; G06F 1/00–2200/00
(Continued)

(56) References Cited

U.S. PATENT DOCUMENTS 5,467,271 A 11/1995 Abel et al.
5,961,573 A 10/1999 Hale et al.
(Continued)

FOREIGN PATENT DOCUMENTS

CA 2956205 A1 * 12/2015 ............. G06Q 10/06
CN 101110161 A 1/2008
(Continued)

OTHER PUBLICATIONS

Sørensen, Claus & Bochtis, Dionysis. (2010). Conceptual model of fleet management in agriculture. Biosystems Engineering. 105. 41-50. 10.1016/j.biosystemseng.2009.09.009. (Year: 2010).*
(Continued)

*Primary Examiner* — Alan S Miller
*Assistant Examiner* — Jay-Ming Wang
(74) *Attorney, Agent, or Firm* — Hickman Palermo Becker Bingham LLP

(57) ABSTRACT

Described herein are a system and methods for identifying fields and tasks (e.g., agricultural fields and tasks). In one embodiment, system includes a display device to display a representation of one or more agricultural fields with geo-referenced boundaries and to receive one or more inputs for identifying at least one agricultural field with agricultural field identification information. A processing system is communicatively coupled to the display device. The processing system is configured to automatically transmit raw data including measurement data and location component data to the display device in response to a machine or an implement starting and to automatically identify location component (Continued)

data of the raw data. The processing system is further configured to automatically assign raw data to at least one agricultural field.

20 Claims, 4 Drawing Sheets

(51) Int. Cl.
 *G06Q 50/02* (2012.01)
 *G06F 3/0488* (2013.01)
 *G06Q 10/10* (2012.01)
(58) Field of Classification Search
 USPC .............................................. 705/7.11–7.42
 See application file for complete search history.

(56) References Cited

U.S. PATENT DOCUMENTS

| | | | |
|---|---|---|---|
| 5,978,723 | A | 11/1999 | Hale et al. |
| 5,995,894 | A | 11/1999 | Wendte |
| 7,802,724 | B1* | 9/2010 | Nohr ................... G07C 9/28 235/384 |
| 8,412,419 | B1 | 4/2013 | Seamon et al. |
| 2001/0016788 | A1 | 8/2001 | Hauwiller et al. |
| 2003/0028321 | A1 | 2/2003 | Upadhyaya et al. |
| 2006/0282467 | A1* | 12/2006 | Peterson ................ G06Q 50/02 |
| 2010/0211594 | A1 | 8/2010 | Penders et al. |
| 2011/0134138 | A1 | 6/2011 | Paris et al. |
| 2011/0270724 | A1* | 11/2011 | O'Neil ................... G06Q 30/04 705/34 |
| 2011/0313779 | A1 | 12/2011 | Herzog et al. |
| 2012/0001876 | A1 | 1/2012 | Chervenka et al. |
| 2013/0282423 | A1 | 10/2013 | Hori et al. |

FOREIGN PATENT DOCUMENTS

| | | |
|---|---|---|
| EP | 2 020 170 A1 | 2/2009 |
| EP | 2 020 171 A1 | 2/2009 |

OTHER PUBLICATIONS

European Patent Office, "Search Report" in application No. 15 863 682.9-1222, dated Nov. 21, 2018, 7 pages.
European Claims in application No. 15 863 682.9-1222, dated Nov. 2018, 3 pages.
European Patent Office, "Search Report" in application No. 15863682.9-1222, dated Mar. 8, 2018, 9 pages.
European Claims in application No. 15863682.9-1222, Dated Mar. 2018, 3 pages.
Brazil Patent Office, "Office Action" in application No. 1120170106981, dated May 26, 2020, 2 pages.
Brazil Claims in application No. 1120170106981, dated May 2020, 4 pages.
Australian Patent Office, "Search Report" in application No. 2015353587, dated May 7, 2020, 4 pages.
Australian claims in application No. 2015353587, dated May 2020, 4 pages.

* cited by examiner

SYSTEM AND METHODS FOR IDENTIFYING FIELDS AND TASKS

CROSS-REFERENCE TO RELATED APPLICATIONS

This application is a U.S. National phase of International Application No. PCT/US2015/062501, filed Nov. 24, 2015, which claims priority to U.S. Provisional Application No. 62/083,640, filed Nov. 24, 2014. The contents of both applications are incorporated herein by reference as if fully set forth herein.

BACKGROUND

This application claims the benefit of U.S. Provisional Application No. 62/083,640, filed on Nov. 24, 2014, the entire contents of which are hereby incorporated by reference.

Planters are used for planting seeds of crops (e.g., corn, soybeans) in a field. Some planters include a display monitor within a cab for displaying a coverage map that shows regions of the field that have been planted. The coverage map of the planter is generated based on planting data collected by the planter. Swath control prevents the planter from planting in a region that has already been planted by the same planter.

A combine harvester or combine is a machine that harvests crops. A coverage map of a combine displays regions of the field that have been harvested by that combine. A coverage map allows the operator of the combine to know that a region of the field has already been harvested by the same combine. The operator may have difficulty operating the machine, operating the implement, and analyzing the data and maps provided by the display monitor in a timely manner.

SUMMARY

Described herein are a system and methods for identifying fields and tasks (e.g., agricultural fields and tasks). In one embodiment, a system includes a display device to display a representation of one or more agricultural fields with geo-referenced boundaries and to receive one or more inputs for identifying at least one agricultural field with agricultural field identification information. A processing system is communicatively coupled to the display device. The processing system is configured to automatically transmit raw data including measurement data and location component data to the display device in response to a machine or an implement starting and to automatically identify location component data of the raw data. The processing system is further configured to automatically assign raw data to at least one agricultural field.

In one example, said at least one agricultural field has been associated with at least one of a business, a farm, and a user.

In another example, automatically identifying location component data of the raw data comprises searching the raw data for data having a characteristic associated with the location component data including at least one of an identifying portion associated with location data and a data unit size, length or frequency associated with location data.

In another example, the processing system is further configured to send a query to a machine network of the machine or an implement network of the implement for requesting location information or identification of location information.

In another example, the measurement data includes at least one of seed sensor data, yield data, and liquid application rate data.

In another example, the location component data includes at least one of GPS data and real-time kinematics data.

In another example, the processing system is integrated with the machine or implement and the display device is removable from the machine.

In one embodiment, a method includes automatically transmitting, with a communication unit, raw data including task information identifying at least one of an agricultural task to be performed and an implement to be used to a display device in response to a machine starting or an implement capable of being attached to the machine starting. The method further includes automatically identifying at least one of an agricultural task and an implement to be used based on the task information. The method further includes generating data and maps from raw data based on the identified agricultural task or implement.

In another example, the method optionally includes displaying the generated data and maps on a graphical user interface of the display device.

In another example, the identified agricultural task comprises harvesting and the raw data includes sensor data and location data to generate a yield map.

In another example, the identified agricultural task comprises planting and the raw data includes sensor data and location data to generate a planting map.

In another example, the automatically identifying at least one of an agricultural task and an implement to be used optionally comprises searching the raw data for data having a characteristic associated with the task information including at least one of an identifying portion associated with task information and a data unit size, length or frequency associated with task data.

In another example, the task information optionally includes an implement identifier that is associated with at least one of implement types, makes, or model.

In another example, the task information optionally includes controller or sensor signals having a frequency and the display device searches a database associating frequency of controller or sensor pulses with a type of agricultural application.

In another example, the method further includes sending a query to a machine network of the machine or an implement network of the implement for requesting location information or identification of location information.

In one embodiment, a method includes initiating a software application on a display device, determining, with at least one of a processing system, a communication unit, and the display device, whether at least one of automatic field identification and automatic task identification occurs based on initiation of the software application. The method further includes displaying on a graphical user interface of the display device at least one of the determined automatic field identification and the automatic task identification if at least one of automatic field identification and automatic task identification occurs. The method further includes receiving input for correcting the automatic field identification with at least one alternative field if correction is needed when the automatic field identification occurs.

In another example, the method optionally includes receiving input for correcting the automatic task identification with at least one alternative task if correction is needed when the automatic task identification occurs.

In another example, the method optionally includes waiting for a subsequent determination of whether at least one of automatic field identification and automatic task identification occurs when no automatic field or task identification is initially determined to have occurred.

In another example, the method optionally includes generating alternative fields for the automatic field identification if appropriate and sending the alternative fields to the display device for display on the graphical user interface.

In another example, the method optionally includes generating alternative tasks for the automatic task identification if appropriate and sending the alternative tasks to the display device for display on the graphical user interface.

DESCRIPTION OF THE DRAWINGS

The present invention is illustrated by way of example, and not by way of limitation, in the figures of the accompanying drawings and in which.

DESCRIPTION

Described herein are a system and methods for identifying fields and tasks (e.g., agricultural fields and tasks). In one embodiment, the system includes a machine (e.g., tractor, combine harvester, etc.) that includes a machine network in communication with a plurality of sensors and controllers on the machine. The machine also includes a communication unit that includes a processor. The communication unit is in data communication with the machine network and an implement network of an implement. The processor processes agricultural data received from the machine network and the implement network to generate processed agricultural data. A display device includes a processor and graphical user interface for displaying the processed agricultural data including fields and tasks for agricultural operations.

Embodiments of the invention provide an improved system and methods for automatic field identification, automatic task identification, correction of the automatic identification if necessary, and correction of the automatic task identification if necessary. An operator or user can review the displayed processed agricultural data for identifying fields and tasks. Subsequently, the user can make any corrections if necessary for the automatic field identification and the automatic task identification. The operator can also remove the display device (e.g., a tablet device, a computing device) after finishing in field operations and review data and images with the display device at a different location (e.g., farm, home) than the location (e.g., field) where the data is acquired.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
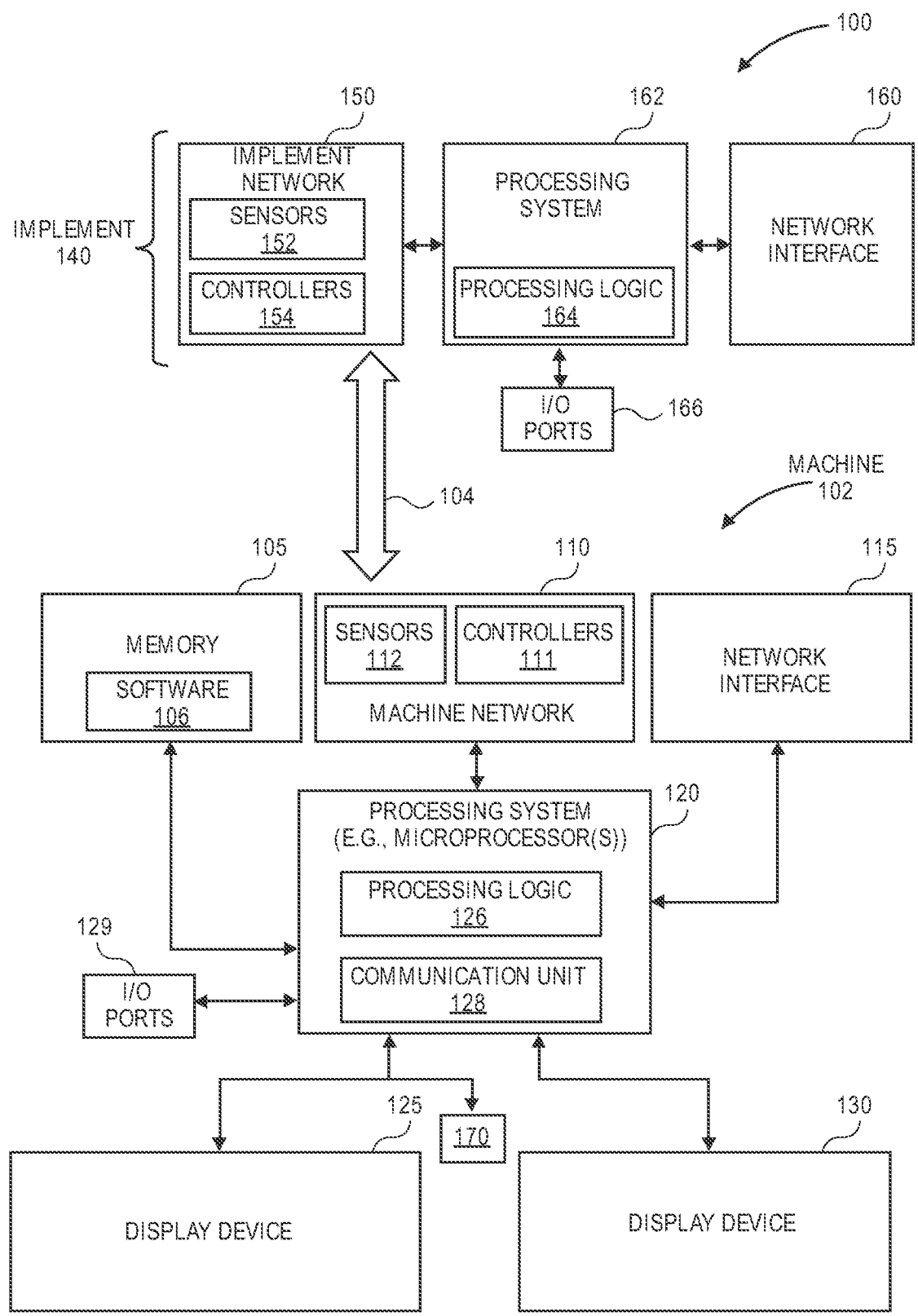
FIG. 1 shows an example of a system 100 that includes a machine 102 (e.g., tractor, combine harvester, etc.) and an implement 140 (e.g., planter, cultivator, plough, sprayer, spreader, irrigation implement, etc.) in accordance with one embodiment.

FIG. 1 shows an example of a system 100 that includes a machine 102 (e.g., tractor, combine harvester, etc.) and an implement 140 (e.g., planter, cultivator, plough, sprayer, spreader, irrigation implement, etc.) in accordance with one embodiment. The machine 102 includes a processing system 120, memory 105, machine network 110 (e.g., a controller area network (CAN) serial bus protocol network, an ISO-BUS network, etc.), and a network interface 115 for communicating with other systems or devices including the implement 140. The machine network 110 includes sensors 112 (e.g., speed sensors) and controllers 111 (e.g., GPS receiver, radar unit) for controlling and monitoring operations of the machine. The network interface 115 can include at least one of a GPS transceiver, a WLAN transceiver (e.g., WiFi), an infrared transceiver, a Bluetooth transceiver, Ethernet, or other interfaces from communications with other devices and systems including the implement 140. The network interface 115 may be integrated with the machine network 110 or separate from the machine network 110 as illustrated in FIG. 1. The I/O ports 129 (e.g., diagnostic/on board diagnostic (OBD) port) enable communication with another data processing system or device (e.g., display devices, sensors, etc.).

The processing system 120 may include one or more microprocessors, processors, a system on a chip (integrated circuit), or one or more microcontrollers. The processing system includes processing logic 126 for executing software instructions of one or more programs and a communication unit 128 (e.g., transmitter, transceiver) for transmitting and receiving communications from the machine via machine network 110 or network interface 115 or implement via implement network 150 or network interface 160. The communication unit 128 may be integrated with the processing system or separate from the processing system. In one embodiment, the communication unit 128 is in data communication with the machine network 110 and implement network 150 via a diagnostic/OBD port of the I/O ports 129.

Processing logic 126 including one or more processors may process the communications received from the communication unit 128 including agricultural data. The system 100 includes memory 105 for storing data and programs for execution (software 106) by the processing system. The memory 105 can store, for example, software components such as an agricultural implement software application for monitoring and controlling field operations, a field and task identification software application or module for identifying one or more fields, identifying one or more tasks, and user correction of the field and task identification, or any other software application or module. The memory 105 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

Display devices 125 and 130 can provide visual user interfaces for a user or operator. The display devices may include display controllers. In one embodiment, the display device 125 is a portable tablet device or computing device with a touchscreen that displays images (e.g., high definition field maps of as-planted or as-harvested data, images for identification of fields and tasks) and data generated by the field and task identification software application or agricultural implement software application and receives input from the user or operator for identifying fields and tasks, correcting identified fields and tasks, or monitoring and controlling field operations. The operations may include configuration of the machine or implement, reporting of data, control of the machine or implement including sensors and controllers, and storage of the data generated. The display device 130 may be a display (e.g., display provided by an original equipment manufacturer (OEM)) that displays images and data for identifying fields and tasks, correcting identified fields and tasks, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 170 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 140 (e.g., planter, cultivator, plough, sprayer, spreader, irrigation implement, etc.) includes an implement network 150, a processing system 162, a network interface 160, and optional input/output ports 166 for communicating with other systems or devices including the machine 102. The implement network 150 (e.g., a controller area network (CAN) serial bus protocol network, an ISO-BUS network, etc.) includes sensors 152 (e.g., speed sensors, seed sensors for detecting passage of seed, downforce sensors, actuator valves, etc.), controllers 154 (e.g., GPS receiver), and the processing system 162 for controlling and monitoring operations of the machine. The sensors may include moisture sensors or flow sensors for a combine, speed sensors for the machine, downforce (e.g., row unit downforce) sensors for a planter, liquid application sensors for a sprayer, or vacuum, lift, or lower sensors for an implement. For example, the sensors may comprise processors in communication with a plurality of seed sensors. The processors are preferably configured to process seed sensor data and transmit processed data to the processing system 162 or 120. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 160 can be a WLAN transceiver (e.g., WiFi), an infrared transceiver, a Bluetooth transceiver, Ethernet, or other interfaces for communication with other devices and systems including the machine 102. The network interface 160 may be integrated with the implement network 150 or separate from the implement network 150 as illustrated in FIG. 1.

The implement communicates with the machine via wired and/or wireless bi-directional communications 104. The implement network 150 may communicate directly with the machine network 150 or via the networks interfaces 115 and 160. The implement may also be physically coupled to the machine for agricultural operations (e.g., planting, harvesting, spraying, etc.).

The memory 105 may be a machine-accessible non-transitory medium on which is stored one or more sets of instructions (e.g., software 106) embodying any one or more of the methodologies or functions described herein. The software 106 may also reside, completely or at least partially, within the memory 105 and/or within the processing system 120 during execution thereof by the system 100, the memory and the processing system also constituting machine-accessible storage media. The software 106 may further be transmitted or received over a network via the network interface device 115.

In one embodiment, a machine-accessible non-transitory medium (e.g., memory 105) contains executable computer program instructions which when executed by a data processing system cause the system to identify agricultural fields and tasks. While the machine-accessible non-transitory medium (e.g., memory 105) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

Figure 2:
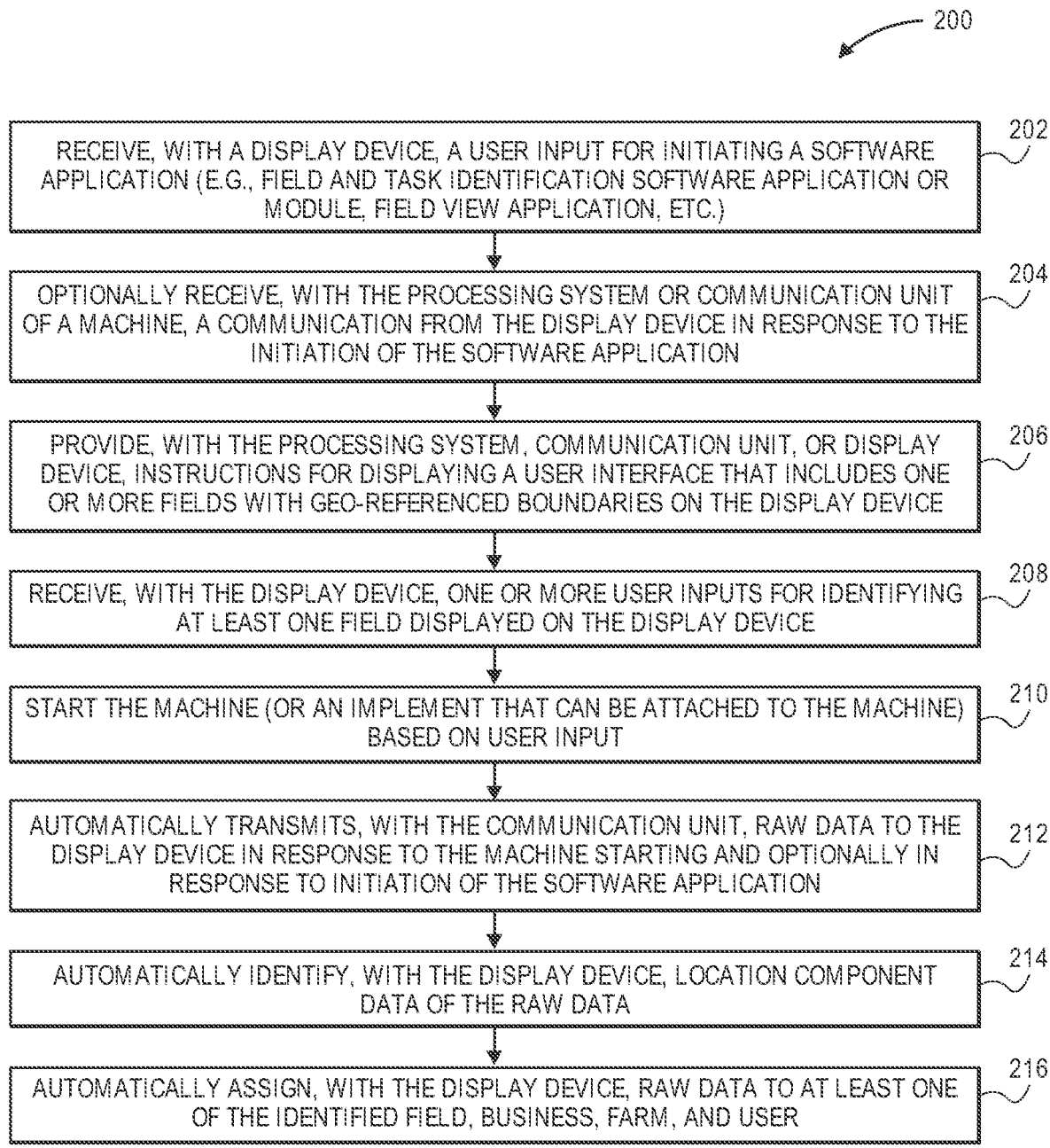
FIG. 2 illustrates a flow diagram of one embodiment for a method 200 of automatically identifying one or more agricultural fields for field operations.

FIG. 2 illustrates a flow diagram of one embodiment for a method 200 of automatically identifying one or more agricultural fields for field operations. The method 200 is performed by processing logic that may comprise hardware (circuitry, dedicated logic, etc.), software (such as is run on a general purpose computer system or a dedicated machine or a device), or a combination of both. In one embodiment, the method 200 is performed by processing logic of at least one of a machine (e.g., processing system of a tractor, processing system of a combine harvester, processing system of an implement, etc.), at least one communication unit of the machine, and processing logic of a display device. The processing system or communication unit of the machine or processing logic of the display device executes instructions of a software application or program. The software application or program can be initiated by an operator or user of a machine (e.g., tractor, combine harvester).

At block 202, a display device optionally receives a user input for initiating a software application (e.g., field and task identification software application or module, agricultural implement software application, etc.) on the display device. At block 204, the processing system or communication unit optionally receives a communication from the display device in response to the initiation of the software application. At block 206, the processing system, communication unit, or display device provides instructions for displaying a user interface that includes one or more fields with georeferenced boundaries on the display device. At block 208, the display device may receive one or more user inputs for identifying at least one field. It should be appreciated that the identifying information associated with the field (e.g., name, boundary) may be stored in memory after having been entered by the user on desktop software and/or obtained from a computer server containing field identification information. Optionally, the user associates at least the identified field with at least one of a business, a farm, and a user. At block 210, the machine (or an implement that can be attached to the machine) starts based on a user input or action. Starting the machine or implement may comprise, e.g., starting the electronic and/or electrical control systems of a tractor, seed planter (e.g., seed meter drive motors thereof), a combine harvester, or a liquid application device (e.g., a metering pump and/or control valve thereof). At block 212, the communication unit automatically transmits raw data to the display device in response to the machine starting and optionally in response to initiation of the software application. The raw data includes measurement data (e.g., seed sensor data, yield data, liquid application rate data) and location component data (e.g., GPS data, real-time kinematics data). Seed sensor data may be generated by an optical or electromagnetic sensor disposed to detect passage of seeds deposited by a seed meter of a seed planter; it should be appreciated that such seed sensor data may result from planting operations carried out by the implement 140 (e.g., seed planter). Yield data may be generated by a yield monitor (e.g., an impact-type sensor generating a yield signal related to the amount of grain striking an impact plate) mounted to a combine harvester and disposed to contact grain being processed or transferred within the combine harvester; it should be appreciated that such yield data may result from crop harvesting operations carried out by the implement 140 (e.g., combine harvester). Liquid application rate data may be generated by a flow rate sensor disposed on a liquid application device (e.g., sprayer or seed planter) to generate a measured or predicted flow rate associated with a valve or flow path; it should be appreciated that such liquid application rate data may result from liquid application operations carried out by the implement 140 (e.g., liquid application device).

At block 214, the display device automatically identifies location component data of the raw data. For example, the display device may search the raw data for data having a characteristic associated with the location component data; in one such example, the display device may search the raw data for data (e.g., a CAN frame) having at least one of the following: (1) an identifying portion (e.g., an identifier field of a CAN frame) associated with location data such as GPS data; and (2) a data unit size, length or frequency associated with location data such as GPS data. In other examples, the display device may send a query (e.g., a message or signal) to the machine network or implement network requesting location information or identification of location information. At block 216, the display device automatically assigns raw data to at least one of the identified field, business, farm, and user. For example, the display device may select a field if the location data is associated with a geo-referenced position within the field boundary.

In another embodiment, the processing system or communication unit of the machine processes the raw data by identifying location component data of the raw data and assigns raw data to at least one of the identified field, business, farm, and user. The processed data is then sent to the display device for display on the graphical user interface of the display device.

Figure 3:
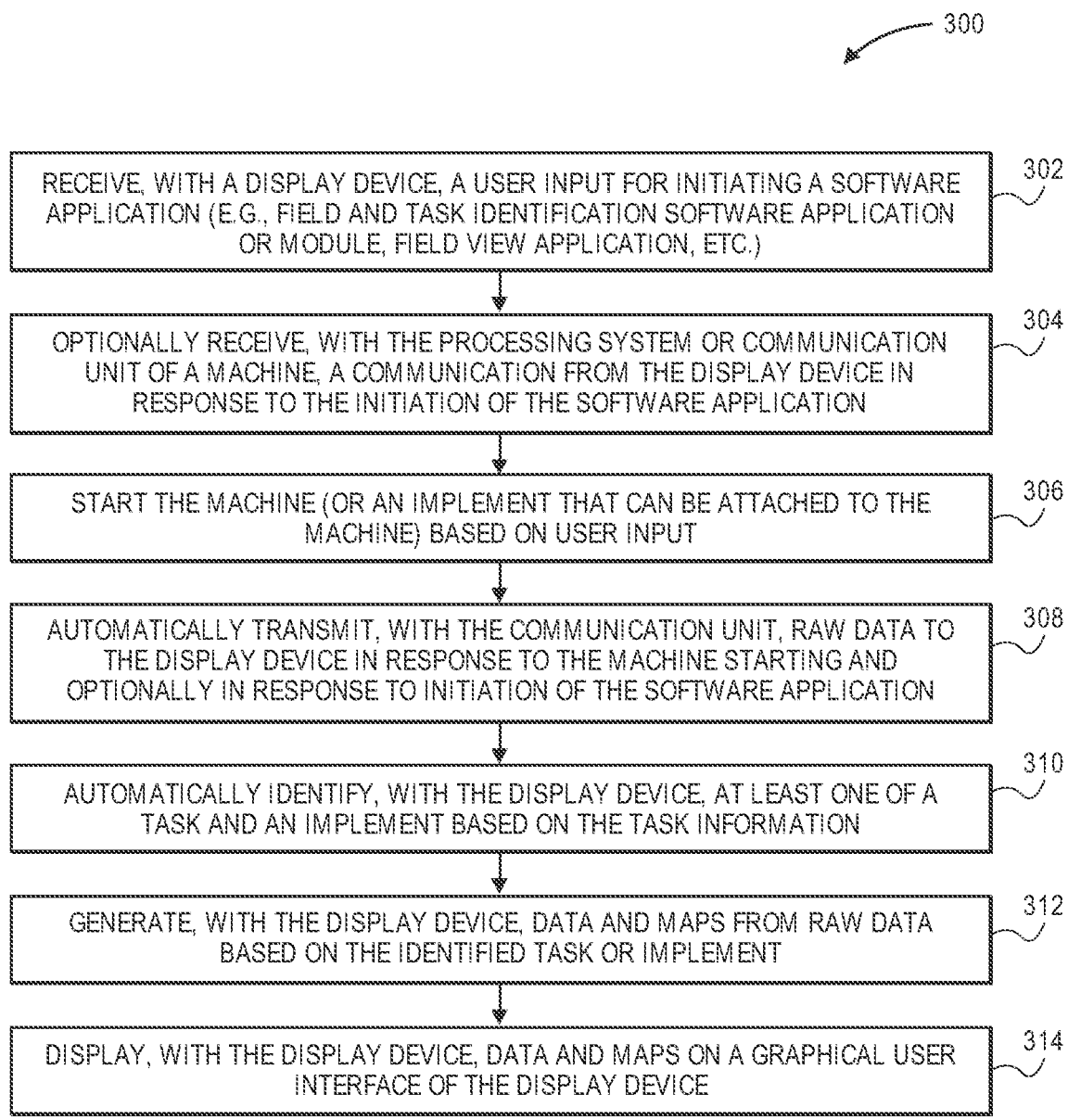
FIG. 3 illustrates a flow diagram of one embodiment for a method 300 of automatically identifying one or more agricultural tasks.

FIG. 3 illustrates a flow diagram of one embodiment for a method 300 of automatically identifying one or more agricultural tasks. The method 300 is performed by processing logic that may comprise hardware (circuitry, dedicated logic, etc.), software (such as is run on a general purpose computer system or a dedicated machine or a device), or a combination of both. In one embodiment, the method 300 is performed by processing logic of at least one of a machine (e.g., processing system of a tractor, processing system of a combine, processing system of an implement, etc.), at least one communication unit of the machine, and processing logic of a display device. The processing system or communication unit of the machine or processing logic of the display device executes instructions of a software application or program. The software application or program can be initiated by an operator or user of a machine (e.g., tractor, planter, combine harvester).

At block 302, a display device optionally receives a user input for initiating a software application (e.g., field and task identification software application or module, agricultural implement software application, etc.) on the display device. At block 304, the processing system or communication unit optionally receives a communication from the display device in response to the initiation of the software application. At block 306, the machine (or an implement that can be attached to the machine) starts based on user input. At block 308, the communication unit automatically transmits raw data to the display device in response to the machine starting and optionally in response to initiation of the software application. The raw data includes task information identifying at least one of a task to be performed and an implement to be used. At block 310, the display device automatically identifies at least one of a task and an implement based on the task information. The display device preferably first identifies the task information in the raw data. For example, the display device may search the raw data for data having a characteristic associated with the task information; in one such example, the display device may search the raw data for data (e.g., a CAN frame) having at least one of the following: (1) an identifying portion (e.g., an identifier field of a CAN frame) associated with task information such as application rate data (e.g., seed sensor data), flow rate data, or yield data; and (2) a data unit size, length or frequency associated with task data. In other examples, the display device may send a query (e.g., a message or signal) to the machine network or implement network requesting task information such as application type information or vehicle or implement information (e.g., a model name or number such as a vehicle identification number). Once the display device has identified the task information, the display device preferably identified at least one of the task and implement using a characteristic of the task information. For example, if the task information includes an implement identifier, the display device may search a database associating implement identifiers with implement types, makes, or model. In other examples, if the task information includes controller or sensor signals having a frequency, the display device may search a database associating frequency of controller or sensor pulses with a type of application (e.g., planting, liquid application, or harvesting). At block 312, the display device generates data and maps from raw data based on the identified task or implement. For example, if the display device determines that the current task is harvesting, the display device preferably uses the sensor data and the location data to generate a yield map. In another example, if the display device determines that the current task is planting, the display device preferably uses the sensor data and the location data to generate a planting map such as a population map. At block 314, the display device displays the generated data and maps on a graphical user interface of the display device.

In another embodiment, the processing system or communication unit of the machine processes the raw data by identifying at least one of a task to be performed and an implement to be used. The processing system or communication unit then generates data and maps from raw data based on the identified task or implement. The processed data is then sent to the display device for display on the graphical user interface of the display device.

Figure 4:
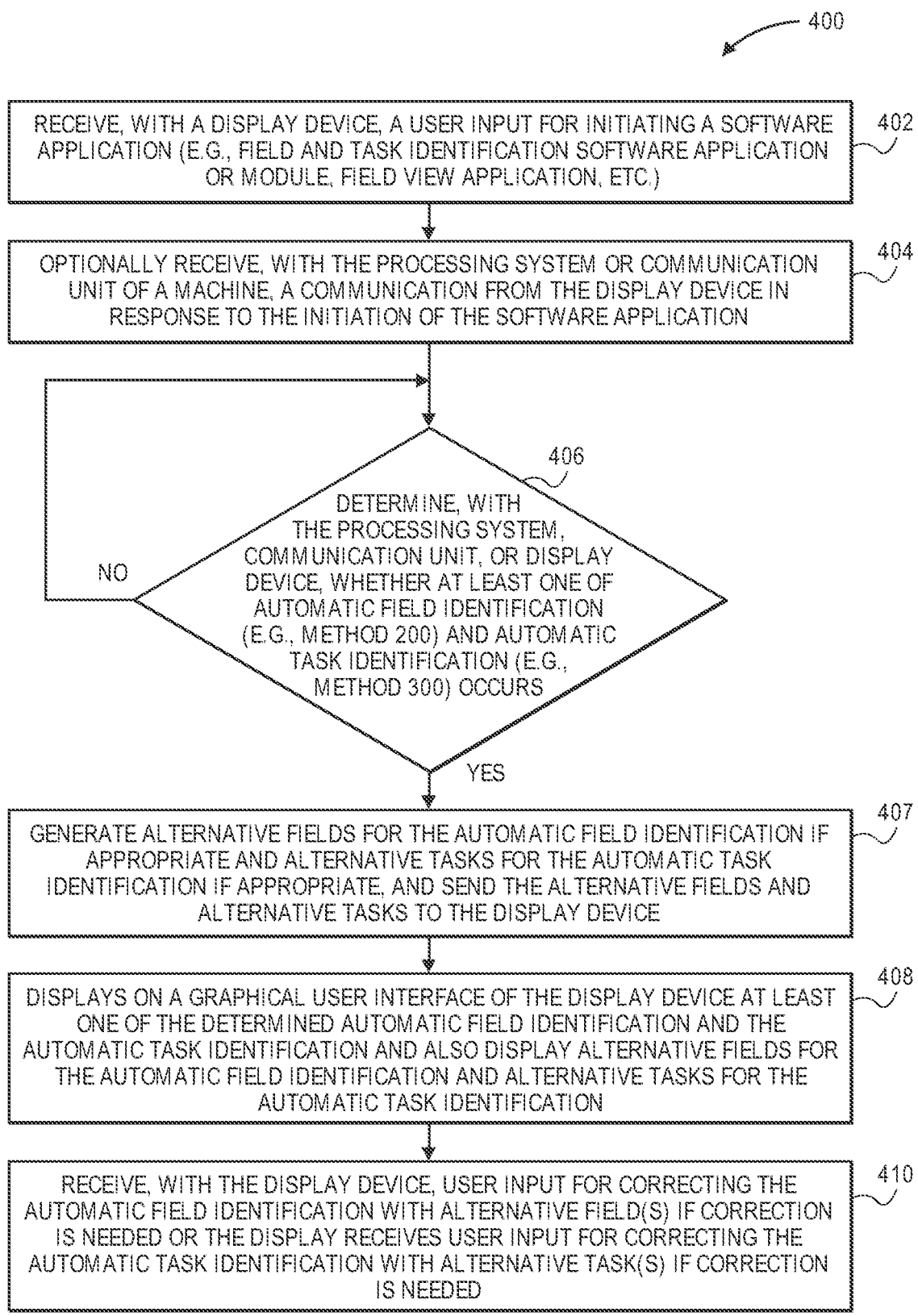
FIG. 4 illustrates a flow diagram of one embodiment for a method 400 of correcting at least one of automatic field identification and automatic task identification.

FIG. 4 illustrates a flow diagram of one embodiment for a method 400 of correcting at least one of automatic field identification and automatic task identification. The method 400 is performed by processing logic that may comprise hardware (circuitry, dedicated logic, etc.), software (such as is run on a general purpose computer system or a dedicated machine or a device), or a combination of both. In one embodiment, the method 400 is performed by processing logic of at least one of a machine (e.g., processing system of a tractor, processing system of a combine, processing system of an implement, etc.), at least one communication unit of the machine, and processing logic of a display device. The processing system or communication unit of the machine or processing logic of the display device executes instructions of a software application or program. The software application or program can be initiated by an operator or user of a machine (e.g., tractor, planter, combine harvester).

At block 402, a display device optionally receives a user input for initiating a software application (e.g., field and task identification software application or module, agricultural implement software application, etc.) on the display device. At block 404, the processing system or communication unit optionally receives a communication from the display device in response to the initiation of the software application. At block 406, the processing system, communication unit, or display device determines whether at least one of automatic field identification (e.g., method 200) and automatic task identification (e.g., method 300) occurs. If so, then the display device displays on a graphical user interface at least one of the determined automatic field identification and the automatic task identification and also displays alternative fields for the automatic field identification and alternative tasks for the automatic task identification at block 408. The display device receives user input for correcting the automatic field identification with an alternative field(s) if correction is needed or the display receives user input for correcting the automatic task identification with an alternative task(s) if correction is needed at block 410. If no automatic field or task identification is determined to have occurred at block 406, then the method 400 waits for a subsequent determination of whether at least one of automatic field identification and automatic task identification occurs when no automatic field or task identification is initially determined to have occurred.

In another embodiment, the processing system or communication unit of the machine performs the operations of block 406, then optionally at operation 407 the processing system or communication unit generates alternative fields for the automatic field identification if appropriate and alternative tasks for the automatic task identification if appropriate, and sends the alternative fields and alternative tasks to the display device for display on the graphical user interface.

In some embodiments, the operations of the method(s) disclosed herein can be altered, modified, combined, or deleted. For example, the operations of blocks 302 and 304 can be removed from method 300 and the operations of blocks 402 and 404 can be removed from method 400. The methods in embodiments of the present invention may be performed with a device, an apparatus, or data processing system as described herein. The device, apparatus, or data processing system may be a conventional, general-purpose computer system or special purpose computers, which are designed or programmed to perform only one function, may also be used.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A system comprising:
a memory;
one or more processors communicatively coupled to an agricultural implement and a display device and configured to perform:
automatically obtaining, as a machine coupled to the agricultural implement is traveling in an agricultural field, raw data measured in real time from the agricultural field by sensors on the agricultural implement or the machine;
automatically identifying an agricultural task being performed by the agricultural implement from the raw data; and
automatically generating, in response to the identifying, maps showing a result of prior performance of the agricultural task in the agricultural field;
transmitting the maps through a communication network to a display device of the machine as the agricultural implement continues traveling in the agricultural field.

2. The system of claim 1, further comprising the agricultural implement or the display device.

3. The system of claim 1, the one or more processors are further configured to perform searching the raw data for data having a characteristic associated with location component data including at least one of an identifying portion associated with location data and a data unit size, length or frequency associated with location data.

4. The system of claim 1, wherein the one or more processors are further configured to perform sending
a query to a machine network of the machine or an implement network of the agricultural implement for requesting location information or identification of location information associated with the raw data.

5. The system of claim 1, wherein the raw data includes at least one of seed sensor data, yield data, and liquid application rate data.

6. The system of claim 3, wherein the location component data includes at least one of GPS data and real-time kinematics data.

7. The system of claim 1, wherein the display device is removable from the machine.

8. A method, comprising:
automatically obtaining, as a machine coupled to an agricultural implement is traveling in an agricultural field, raw data measured in real time from the agricultural field by sensors on the agricultural implement or the machine;
automatically identifying an agricultural task being performed by the agricultural implement from the raw data; and
automatically generating, in response to the identifying, maps showing a result of prior performance of the agricultural task in the agricultural field;

transmitting the maps through a communication network to a display device of the machine as the agricultural implement continues traveling in the agricultural field.

9. The method of claim 8, further comprising automatically identifying the agricultural implement from the raw data.

10. The method of claim 8, wherein the identified agricultural task comprises harvesting and the raw data includes sensor data and location data to generate a yield map.

11. The method of claim 8, wherein the identified agricultural task comprises planting and the raw data includes sensor data and location data to generate a planting map.

12. The method of claim 8, wherein automatically identifying the agricultural task comprises searching the raw data for data including at least one of an identifying portion associated with task information and a data unit size, length or frequency associated with task data.

13. The method of claim 12, wherein the task information includes an implement identifier that is associated with at least one of implement types, makes, or model.

14. The method of claim 12,
wherein the raw data includes controller or sensor signals having a frequency,
wherein automatically identifying the agricultural task comprises searching a database associating frequency of controller or sensor pulses with a type of agricultural application.

15. The method of claim 8, further comprising:
sending a query to a machine network of the machine or an implement network of the agricultural implement for requesting location information or identification of location information.

16. A method of claim 8, further comprising:
initiating a software application;
determining, with a processing system, a communication unit, or the display device, whether at least one of automatic field identification and automatic task identification occurs based on initiation of the software application;
displaying on a graphical user interface of the display device at least one of the determined automatic field identification and the automatic task identification if at least one of automatic field identification and automatic task identification occurs; and
receiving input for correcting the automatic field identification with at least one alternative field if correction is needed when the automatic field identification occurs.

17. The method of claim 16, further comprising:
receiving input for correcting the automatic task identification with at least one alternative task if correction is needed when the automatic task identification occurs.

18. The method of claim 16, further comprising:
waiting for a subsequent determination of whether at least one of automatic field identification and automatic task identification occurs when no automatic field or task identification is initially determined to have occurred.

19. The method of claim 16, further comprising:
generating alternative fields for the automatic field identification if appropriate; and
sending the alternative fields to the display device for display on the graphical user interface.

20. The method of claim 16, further comprising:
generating alternative tasks for the automatic task identification if appropriate; and
sending the alternative tasks to the display device for display on the graphical user interface.

* * * * *